United States Patent
Nonaka et al.

(10) Patent No.: US 7,220,691 B2
(45) Date of Patent: May 22, 2007

(54) DIELECTRIC CERAMIC COMPOSITION AND ELECTRONIC DEVICE

(75) Inventors: Tomoaki Nonaka, Nikaho (JP); Hiroshi Sasaki, Nikaho (JP); Tsutomu Odashima, Nikaho (JP); Takahiro Harada, Nikaho (JP); Matsumi Watanabe, Nikaho (JP); Tetsuo Takaishi, Nikaho (JP); Shinsuke Hashimoto, Nikaho (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/527,703

(22) Filed: Sep. 27, 2006

(65) Prior Publication Data

US 2007/0078049 A1    Apr. 5, 2007

(30) Foreign Application Priority Data

Sep. 30, 2005    (JP) .............................. 2005-288493

(51) Int. Cl.
    *C04B 35/468*    (2006.01)
(52) U.S. Cl. ................. 501/139; 428/210; 428/702
(58) Field of Classification Search ................ 501/138, 501/139; 428/210, 702
    See application file for complete search history.

(56) References Cited

U.S. PATENT DOCUMENTS

| 5,403,797 A | * | 4/1995 | Ohtani et al. ................ 501/138 |
| 5,862,034 A | * | 1/1999 | Sato et al. ................ 361/321.5 |
| 6,849,567 B2 | * | 2/2005 | Kim et al. .................. 501/139 |

FOREIGN PATENT DOCUMENTS

| JP | 2001089231 | * | 4/2001 |
| JP | A 2005-104772 | | 4/2005 |

\* cited by examiner

*Primary Examiner*—Karl Group
(74) *Attorney, Agent, or Firm*—Oliff & Berridge, PLC

(57) ABSTRACT

A dielectric ceramic composition comprising 100 moles of barium titanate as the main component, and furthermore comprising with respect to 100 moles of the main component 0.1 to 3 moles of a first subcomponent including a magnesium oxide, 0.01 to 0.5 mole (note that 0.5 is not included) of a second subcomponent including a yttrium oxide, 0.01 to 0.2 mole of a third subcomponent including a vanadium oxide, and 0.5 to 10 moles of a glass component including a silicon oxide as the main component; wherein a manganese oxide and a chrome oxide are substantially not included, and an average particle diameter of dielectric particles is 0.35 µm or smaller.

9 Claims, 6 Drawing Sheets

DIELECTRIC CERAMIC COMPOSITION AND ELECTRONIC DEVICE

BACKGROUND OF THE INVENTION

1. Field of the Invention

The present invention relates to a dielectric ceramic composition, a multilayer ceramic capacitor and an electronic device, and particularly relates to a dielectric ceramic composition being excellent in all of permittivity, capacity-temperature characteristics and a high temperature load lifetime even when dielectric particles composing the dielectric ceramic composition are made finer.

2. Description of the Related Art

In recent years, electronic apparatuses have been rapidly made downsized and higher in performance, and there has been a demand for electronic devices to be mounted in the electronic apparatuses to be also downsized and higher in performance. Multilayer ceramic capacitors as an example of the electronic devices have been demanded to be downsized and to have a larger capacity.

Also, these electronic apparatuses are used under various environments depending on the use objects, so that high reliability is demanded in temperature characteristics and lifetime, etc.

As necessary characteristics to satisfy such demands, a stable capacity-temperature change rate and a long durability under severe conditions as well as high permittivity may be mentioned.

Thus, to solve these points, the present inventors have studied on subcomponents of a dielectric ceramic composition and developed a capacitor having well-balanced permittivity, capacity-temperature change rate and high temperature load lifetime as disclosed in the Japanese Unexamined Patent Publication No. 2005-104772.

However, the present inventors pursued furthermore improvement of performance and obtained knowledge that dielectric particles composing the dielectric ceramic composition had to be finer to make the dielectric layers thinner and larger in number. When actually attempting to make the dielectric particles of the dielectric ceramic composition finer as disclosed in the Japanese Unexamined Patent Publication No. 2005-104772, it turned out that the specific permittivity abruptly declined when an average particle diameter of the dielectric particles became 0.35 µm or smaller.

Namely, when making the dielectric particles finer, particularly when the average particle diameter of the dielectric particles is made 0.35 µm or smaller, approaches of the related art to improve the characteristics turned out to be ineffective.

SUMMARY OF THE INVENTION

An object of the present invention is to provide a dielectric ceramic composition, which exhibits preferable specific permittivity, a capacity-temperature change rate and a high temperature load lifetime even when an average particle diameter of the dielectric particles is 0.35 µm or smaller. Another object of the present invention is to provide a capacitor having a dielectric layer formed by the dielectric ceramic composition.

To attain the above object, the present inventors have committed themselves to study and found the following new knowledge. Namely, when an average particle diameter of the dielectric particles becomes 0.35 µm or smaller, segregation of a yttrium oxide as a subcomponent of the dielectric ceramic composition is easily caused to increase defects, which has been considered as a factor of declining the specific permittivity.

In the present invention, it was found that, by decreasing an adding amount of a yttrium oxide and furthermore adjusting an average particle diameter of the dielectric particles, characteristics such as the specific permittivity, capacity-temperature change rate and high temperature load lifetime, could be improved.

Namely, according to the present invention, there is provided a dielectric ceramic composition comprising:
 a main component including barium titanate;
 a first subcomponent including a magnesium oxide;
 a second subcomponent including a yttrium oxide;
 a third subcomponent including a vanadium oxide; and
 a glass component including a silicon oxide as the main component;
 wherein rates of respective subcomponents with respect to 100 moles of barium titanate as the main component are;
 the first subcomponent: 0.1 to 3 moles,
 the second subcomponent: 0.01 to 0.5 mole (note that 0.5 is not included),
 the third subcomponent: 0.01 to 0.2 mole, and
 the glass component: 0.5 to 10 moles;
 a manganese oxide and a chrome oxide are substantially not included; and
 an average particle diameter of dielectric particles composing the dielectric ceramic composition is 0.35 µm or smaller.

According to the present invention, it is possible to provide a dielectric ceramic composition having a preferable capacity-temperature change rate and high temperature load lifetime while maintaining high permittivity, even in the case of making an average particle diameter of the dielectric particles as fine as 0.35 µm or smaller, as a result that the subcomponents and glass component of the dielectric ceramic composition satisfy the composition ranges as above and, particularly, an adding amount of a yttrium oxide, which has been considered to be necessarily added in a certain amount (0.5 mole) or larger to improve the characteristics, is decreased.

Preferably, glass component is expressed by a chemical formula $M_xSiO_3$, wherein "M" includes at least one of Ba, Ca, Sr, Li and B and "x" is in a range of ⅔ to 2.

Preferably, Ba/Ti indicating a mole ratio of Ba and Ti in the barium titanate is in a range of 0.985 to 1.033, more preferably 0.990 to 1.030, and furthermore preferably 1.011 to 1.030. When Ba/Ti is too small, the specific permittivity, capacity-temperature change rate and high temperature load lifetime tend to all decline. When Ba/Ti is too large, the specific permittivity and high temperature load lifetime tend to decline.

Preferably, a half value width of a peak of (111) plane of the dielectric ceramic composition is 0.143 degree or smaller, more preferably 0.140 degree or smaller, and furthermore preferably 0.135 degree or smaller. When the half value width is too large, it is liable that the crystalline deteriorates and the high temperature load lifetime decline. Furthermore, abnormal grain growth may be caused in some cases.

Preferably, a manganese oxide is substantially not included in the dielectric ceramic composition, and a specific content thereof is 0.01 mole or smaller with respect to 100 moles of barium titanate. When a manganese oxide is included, it segregates near nickel internal electrodes and oxidizes the nickel electrodes, so that breaking of the electrodes arises.

Preferably, a chrome oxide is substantially not included in the dielectric ceramic composition, and a specific content thereof is 0.01 mole or smaller with respect to 100 moles of barium titanate. It is desired not to use a chrome oxide in terms of environment issues.

An electronic device according to the present invention comprises a dielectric layer composed of the dielectric ceramic composition as above.

A multilayer ceramic capacitor as an example of the electronic device according to the present invention comprises a capacitor element body obtained by alternately stacking dielectric layers composed of the dielectric ceramic composition as above and internal electrode layers.

Preferably, a capacity-temperature change rate ($\Delta C/C_{20}$) in a state of being applied with a direct current voltage having electric field strength of 1V/μm at a temperature of 85° C. is within ±10% when assuming capacitance with an applied voltage of 0V at a temperature of 20° C. as the criterion.

Preferably, a thickness of the dielectric layer is 3 μm or thinner.

Preferably, when measuring a high temperature load lifetime by maintaining a state of applying a direct current of 30V/μm at a testing temperature of 200° C., time from the start of the application of the direct current voltage until reaching of a current value of a detected current to 2 mA or higher in a state of being applied with the direct current voltage is 25 hours or longer, more preferably 35 hours or longer, and furthermore preferably 50 hours or longer.

BRIEF DESCRIPTION OF DRAWINGS

These and other objects and features of the present invention will become clearer from the following description of the preferred embodiments given with reference to the attached drawings, in which.

DESCRIPTION OF THE PREFERRED EMBODIMENT

Figure 1:
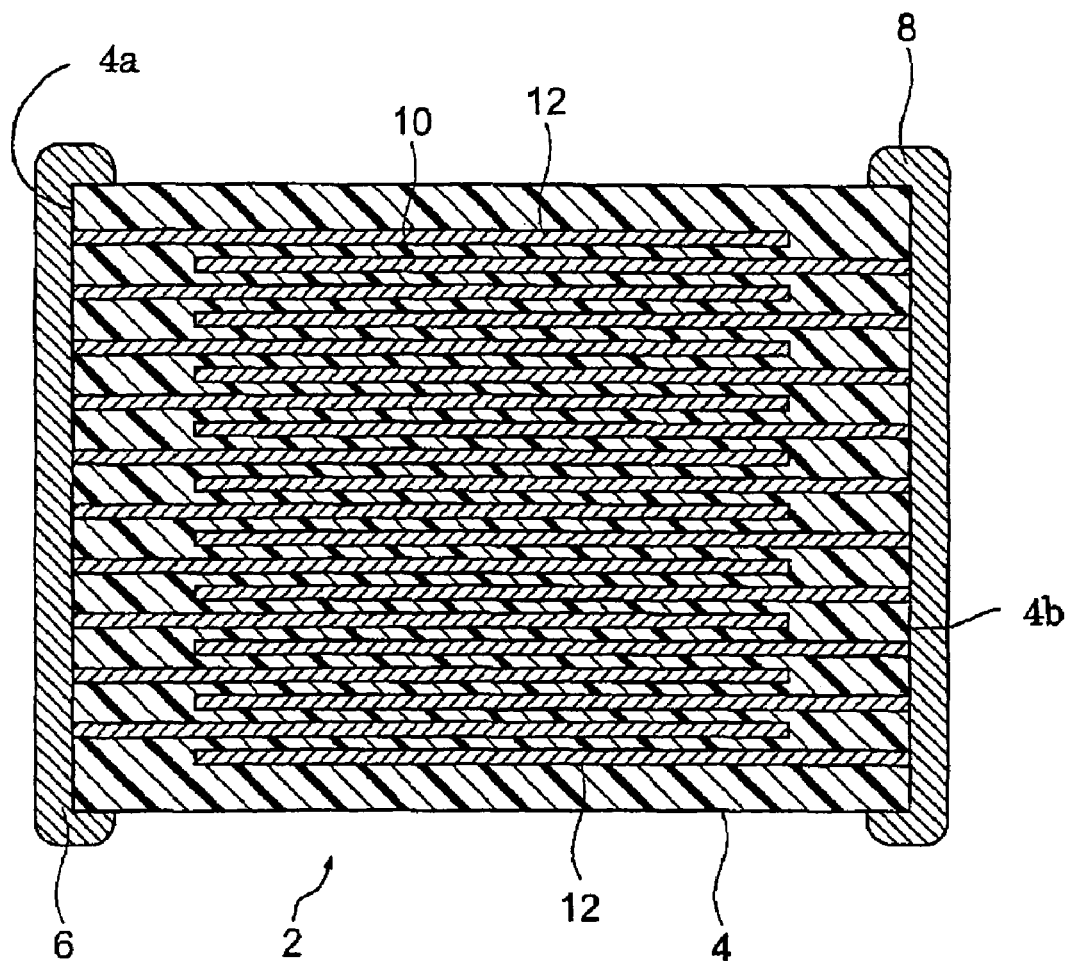
FIG. 1 is a schematic cross-sectional view of a multilayer ceramic capacitor according to an embodiment of the present invention.

As shown in FIG. 1, a multilayer ceramic capacitor 2 according to an embodiment of the present invention includes a capacitor element body 4 configured by alternately stacking dielectric layers 10 and internal electrode layers 12. One side of the alternately stacked internal electrode layers 12 is electrically connected to inside of a first terminal electrode 6 formed outside of a first terminal portion 4a of the capacitor element body 4. Also, the other side of the alternately stacked internal electrode layers 12 is electrically connected to inside of a second terminal electrode 8 formed outside of a second terminal portion 4b of the capacitor element body 4.

A shape of the capacitor element body 4 is not particularly limited and suitably selected in accordance with an object and use thereof, but it is normally a rectangular parallelepiped shape. The size is not limited, either, and suitably selected in accordance with an object and use thereof. It is normally length (0.4 to 5.6 mm)×width (0.2 to 5.0 mm)× height (0.2 to 1.9 mm) or so.

The dielectric layers 10 include the dielectric ceramic composition of the present invention.

The dielectric ceramic composition according to the present embodiment comprises
a main component including barium titanate,
a first subcomponent including a magnesium oxide,
a second subcomponent including a yttrium oxide,
a third subcomponent including a vanadium oxide, and
a glass component including a silicon oxide as the main component;
wherein
a manganese oxide and a chrome oxide are substantially not included, and
an average particle diameter of dielectric particles composing the dielectric ceramic composition is 0.35 μm or smaller, preferably 0.27 μm or smaller. When an average particle diameter of the dielectric particles becomes larger, the specific permittivity tends to decline.

The first subcomponent is preferably MgO and is contained in an amount of 0.1 to 3 moles and preferably in an amount of 0.5 to 2 moles with respect to 100 moles of barium titanate. When the content is too small, resistance to reduction and a high temperature load lifetime thereof tend to decline, while when too large, it is liable that the sinterability is deteriorated and the specific permittivity declines.

The second subcomponent is preferably $Y_2O_3$ and is contained in an amount of 0.01 to 0.5 mole (note that 0.5 is not included) and preferably in an amount of 0.2 to 0.4 mole with respect to 100 moles of barium titanate. When the content is too small, the high temperature load lifetime tends to decline, while when too large, the specific permittivity tends to decline.

The third subcomponent is preferably $V_2O_5$ and is contained in an amount of 0.01 to 0.2 mole and preferably 0.01 to 0.15 mole with respect to 100 moles of barium titanate. When the content is too small, an effect of flattening the capacity-temperature characteristics decreases and the IR lifetime tends to decline, while when too large, the IR tends to decline remarkably.

The glass component is preferably expressed by the chemical formula $M_xSiO_3$, wherein "M" includes at least one of Ba, Ca, Sr, Li and B and "x" is in a range of ⅔ to 2. More preferably, it is $Ba_\alpha Ca_{(1-\alpha)}SiO_3$ and is contained in an amount of 0.5 to 10 moles and preferably in an amount of 0.5 to 3 moles with respect to 100 moles of barium titanate. When the content is too small, the sinterability tends to deteriorate, while when too large, the specific permittivity tends to decline.

Furthermore, $Ba_\alpha Ca_{1-\alpha}SiO_3$ as a composite oxide has a low melting point and exhibits preferable reactivity to the main component, so that BaO and/or CaO are preferably added as a composite oxide as above than to be respectively added as BaO and CaO as single oxides.

Note that the mark "$\alpha$" indicating a composition mole ratio of Ba and Ca may be any ($0 \leq \alpha \leq 1$) and only one of them may be included, but $0.3 \leq \alpha \leq 0.7$ is preferable.

The "Ba/Ti" indicating a mole ratio of Ba and Ti in barium titanate as the main component of the dielectric ceramic composition is 0.985 to 1.033, more preferably 0.990 to 1.030, and furthermore preferably 1.011 to 1.030. When the Ba/Ti is too small, all of the specific permittivity, capacity-temperature change rate and high temperature load lifetime tend to decline. When the Ba/Ti is too large, the specific permittivity and high temperature load lifetime tend to decline.

A half value width of a peak of (111) plane of the dielectric ceramic composition is 0.143 degree or smaller, more preferably 0.140 degree or smaller, and furthermore preferably 0.135 degree or smaller. When the half value width is too large, it is liable that the crystalline state declines and the high temperature load lifetime declines. Furthermore, abnormal grain growth may arise in some cases.

The manganese oxide is mainly MnO and it does not matter if it is to an extent of substantially not included. The content is preferably 0.01 mole or smaller, more preferably 0.005 mole or smaller, and furthermore preferably 0.0001 mole or smaller with respect to 100 moles of barium titanate.

The chrome oxide is mainly $Cr_2O_3$ and it does not matter if it is to an extent of substantially not included. The content is preferably 0.01 mole or smaller, more preferably 0.005 mole or smaller, and furthermore preferably 0.0001 mole or smaller with respect to 100 moles of barium titanate.

A conductive material included in the internal electrode layers 12 is not particularly limited and base metals may be used because components of the dielectric layers 10 has resistance to reduction. As base metals to be used as the conductive material, Ni or a Ni alloy is preferable. As a Ni alloy, an alloy of at least one kind of element selected from Mn, Cr, Co and Al with Ni, and a Ni content in the alloy is preferably 95 wt % or larger.

Note that Ni or a Ni alloy may include P or other variety of trace components in an amount of not exceeding 0.1 wt % or so.

A thickness of one internal electrode layer may be suitably determined and is normally 0.5 to 5 μm and particularly preferably 0.5 to 1.5 μm.

A conductive material to be included in the terminal electrodes 6 and 8 is not particularly limited and inexpensive Ni, Cu and alloys of these may be used in the present invention. Also, a thickness of each of the terminal electrodes 6 and 8 may be suitably determined in accordance with the use object, etc., but is normally 10 to 50 μm or so.

A multilayer ceramic capacitor using the dielectric ceramic composition of the present invention is produced by forming a green chip by a normal printing method or sheet method using pastes, firing the same, printing or transferring terminal electrodes thereon and firing in the same way as in the related art. Below, the production method will be explained specifically.

First, dielectric ceramic composition powder included in dielectric layer paste is prepared and made to be slurry to fabricate dielectric layer paste. The dielectric layer paste may be organic based slurry obtained by kneading the dielectric ceramic composition powder with an organic vehicle, or water based slurry.

As the dielectric ceramic composition powder, the oxides mentioned above, mixtures of them, and composite oxides may be used, alternately, it may be suitably selected from a variety of compounds to be the above oxides and composite oxides by firing, such as carbonate, oxalate, nitrate, hydroxide and organic metal compound, etc., and mixed for use. Contents of respective compounds in the dielectric ceramic composition powder may be determined so as to attain a composition of the above dielectric ceramic composition after firing. A particle diameter of the dielectric ceramic composition powder is normally 0.1 to 1.0 μm or so as an average particle diameter in a state before being made to be slurry.

An organic vehicle is obtained by dissolving a binder in an organic solvent. The binder to be used for the organic vehicle is not particularly limited and may be suitably selected from a variety of normal binders, such as ethyl cellulose and polyvinyl butyral. Also, the organic solvent to be used is not particularly limited and may be suitably selected from a variety of organic solvents, such as terpineol, butyl carbitol, acetone, and toluene, in accordance with a method to be used, such as the printing method and sheet method.

When using water based slurry as dielectric layer paste, a water based vehicle obtained by dissolving a water-soluble binder and dispersant, etc. in water may be kneaded with a dielectric material. The water-soluble binder used for the water based vehicle is not particularly limited and, for example, polyvinyl alcohol, cellulose and water-soluble acrylic resin, etc. may be used.

The internal electrode layer paste is fabricated by kneading a conductive material formed by the above variety of conductive metals and alloys or a variety of oxides, organic metal compounds, and resinates, etc., which become the above conductive material after firing, with the above organic vehicle. Terminal electrode paste may be fabricated in the same way as the internal electrode layer paste explained above.

A content of the organic vehicle in each of the paste is not particularly limited and may be a normal content of, for example, about 1 to 5 wt % of the binder and about 10 to 50 wt % of the solvent. Also, each paste may include additives selected from a variety of dispersants, plasticizers, dielectrics and insulators, etc. in accordance with need. A total content of them is preferably not larger than 10 wt %.

When using a printing method, the dielectric layer paste and the internal electrode layer paste are printed by stacking on a substrate, such as PET, cut to a predetermined shape and detached from the substrate so as to obtain a green chip.

While when using a sheet method, the dielectric layer paste is used for forming a green sheet, the internal electrode layer paste is printed thereon, and the results are stacked to obtain a green chip.

Before firing, binder removal processing is performed on the green chip. The binder removal processing may be suitably determined in accordance with a kind of a conductive material in the internal electrode layer paste, and when using Ni, a Ni alloy or other base metal as the conductive material, the oxygen partial pressure in the binder removal atmosphere is preferably $10^{-45}$ to $10^5$ Pa. When the oxygen partial pressure is too low, the binder removal effect declines; while when too high, the internal electrode layer tends to be oxidized.

Also, as other binder removal conditions, the temperature raising rate is preferably 5 to 300° C./hour and more preferably 10 to 100° C./hour, the holding temperature is preferably 180 to 400° C. and more preferably 200 to 350° C., and the temperature holding time is preferably 0.5 to 24 hours and more preferably 2 to 20 hours. Also, the binder removal atmosphere is preferably in the air or a reducing atmosphere, and a preferable atmosphere gas in the reducing atmosphere is, for example, a wet mixed gas of $N_2$ and $H_2$.

An atmosphere at firing the green chip may be suitably determined in accordance with a kind of a conductive material in the internal electrode layer paste, and when using Ni, a Ni alloy and other base metal as the conductive material, the oxygen partial pressure in the firing atmosphere is preferably $10^{-12}$ to $10^{-11}$ Pa. When the oxygen partial pressure is too low, a conductive material in the internal electrode layer is abnormally sintered to be broken in some cases; while when too high, the internal electrode layer tends to be oxidized.

Also, the holding temperature at firing is preferably 1100 to 1400° C., and more preferably 1200 to 1350° C. When the holding temperature is too low, densification becomes insufficient, while when too high, breakings of electrodes due to abnormal sintering of the internal electrode layer, deterioration of capacity-temperature characteristics due to dispersion of the internal electrode layer component, and reduction of the dielectric ceramic composition are easily caused.

As other firing conditions, the temperature rising rate is preferably 50 to 500° C./hour and more preferably 200 to 300° C./hour, the temperature holding time is preferably 0.5 to 8 hours and more preferably 1 to 3 hours, and the cooling rate is preferably 50 to 500° C./hour and more preferably 200 to 300° C./hour. Also, the firing atmosphere is preferably a reducing atmosphere and a preferable atmosphere gas is, for example, a wet mixed gas of $N_2$ and $H_2$.

When firing in a reducing atmosphere, it is preferable that annealing is performed on the capacitor element body. Annealing is processing for re-oxidizing the dielectric layer and the IR lifetime is remarkably elongated thereby, so that the reliability is improved.

An oxygen partial pressure in the annealing atmosphere is preferably $10^{-8}$ Pa or higher, and particularly preferably $10^{-7}$ to $10^{-6}$ Pa. When the oxygen partial pressure is too low, re-oxidization of the dielectric layer becomes difficult, while when too high, the internal electrode layer tends to be oxidized.

The holding temperature at annealing is preferably 1100° C. or lower, and particularly preferably 500 to 1100° C. When the annealing temperature is too low, oxidization of the dielectric layer generally becomes insufficient, so that the IR becomes low and the IR lifetime becomes short easily. On the other hand, when the holding temperature at annealing is too high, not only the internal electrode layer is oxidized to decrease the capacitance, but the internal electrode layer reacts with the dielectric base material, and deterioration of the capacity-temperature characteristics, a decline of the IR and a decline of the IR lifetime are easily caused.

Note that the annealing may be composed only of a temperature rising step and a temperature lowering step. Namely, the temperature-holding time may be zero. In this case, the holding temperature is a synonym of the highest temperature. As other annealing conditions, the temperature holding time is preferably 0 to 20 hours and more preferably 2 to 10 hours, and the cooling rate is preferably 50 to 500° C./hour and more preferably 100 to 300° C./hour. Also, a preferable atmosphere gas of annealing is, for example, a wet $N_2$ gas, etc.

In the above binder removal processing, firing and annealing, for example, a wetter, etc. may be used to wet the $N_2$ gas and mixed gas, etc. In this case, the water temperature is preferably 5 to 75° C. or so.

The binder removal processing, firing and annealing may be performed continuously or separately. When performing continuously, the atmosphere is changed without cooling after the binder removal processing, continuously, the temperature is raised to the holding temperature at firing to perform firing. Next, it is cooled and the annealing is preferably performed by changing the atmosphere when the temperature reaches to the holding temperature of the annealing.

End surface polishing, for example, by barrel polishing or sand blast, etc. is performed on the capacitor element body obtained as above, and the terminal electrode paste is printed or transferred and fired to form terminal electrodes 6 and 8. Burning processing of the terminal electrode paste is preferably performed, for example, in a mixed gas of $N_2$ and $H_2$ at 600 to 800° C. for 10 minutes to 1 hour or so in the present embodiment. A cover layer is formed by plating, etc. on the surface of the terminal electrodes 6 and 8 if necessary.

A multilayer ceramic capacitor of the present invention produced as above is mounted on a print substrate, etc. by soldering, etc. and used for a variety of electronic apparatuses, etc.

Note that the multilayer ceramic capacitor of the present embodiment exhibits excellent temperature characteristics and high temperature load lifetime in a state of being applied a direct current voltage of high electric field strength even when a thickness of the dielectric layer is made as thin as 3 µm or thinner.

For example, when using capacitance at a temperature of 20° C. applied with a voltage of 0V as a criterion, the capacity-temperature change rate ($\Delta C/C_{20}$) at a temperature of 85° C. applied with a direct current voltage having electric field strength of 1V/µm is preferably within ±10%.

As to the high temperature load lifetime, for example, under a condition of holding in a state of being applied with a direct current voltage of 30V/μm at a testing temperature of 200° C., time from the start of application of the direct current voltage until reaching of a current value of a detected current to 2 mA or higher in a state of being applied with the direct current voltage is preferably 25 hours or longer, more preferably 35 hours or longer, and furthermore preferably 50 hours or longer.

An embodiment of the present invention was explained above, however, the present invention is not limited to the embodiment and may be variously modified within the scope of the present invention.

For example, in the above embodiment, a multilayer ceramic capacitor was explained as an example of electronic devices according to the present invention, but electronic devices according to the present invention is not limited to the multilayer ceramic capacitor and may be any as far as including a dielectric layer composed by the dielectric ceramic composition having the above composition.

EXAMPLES

Below, the present invention will be explained based on further detailed examples, but the present invention is not limited to the examples.

Example 1

First, to produce a dielectric material, $BaTiO_3$ as the main component, the first to third subcomponents and a glass component were prepared as starting materials. An average particle diameter of the starting materials was suitably selected from a range of 0.15 to 1.0 μm, respectively. As the glass component $M_xSiO_3$, $Ba_\alpha Ca_{(1-\alpha)}SiO_3$ was used. Note that a value of "α" was 0.58.

As a material of MgO as the first subcomponent, $MgCO_3$ as carbonate was used, and oxides (the second subcomponent: $Y_2O_3$, the third subcomponent: $V_2O_5$ and the glass component: $Ba_{0.58}Ca_{0.42}SiO_3$) were used as other materials. Note that $Ba_{0.58}Ca_{0.42}SiO_3$ as the glass component was weighed to satisfy a predetermined ratio of $BaCO_3$, $CaCO_3$ and $SiO_2$ and produced by wet mixing by a ball mill for 16 hours, drying, then, firing at 1150° C. in the air and, furthermore, wet grinding by a ball mill for 100 hours.

Note that as to $BaTiO_3$ as the main component, the same characteristics were obtained also by using what produced by respectively weighing $BaCO_3$ and $TiO_2$, wet mixing by a ball mill for about 16 hours, drying the result, firing at 1100° C. in the air and wet grinding by a ball mill for about 16 hours. Also, as to $BaTiO_3$ as the main component, the same characteristics were obtained also by using what produced by hydrothermal synthesis method and the oxalate method, etc.

These materials were blended so as to obtain a composition after firing of 0.81 mole of MgO, 0.1 mole of $V_2O_5$, 1 mole of $Ba_{0.58}Ca_{0.42}SiO_3$ and 0.2 mole or 1.04 mole of $Y_2O_3$ with respect to 100 moles of $BaTiO_3$ as the main component, wet mixed by a ball mill for 16 hours and dried to obtain the dielectric material.

By mixing by a ball mill 100 parts by weight of the obtained dielectric material, 6 parts by weight of an acrylic resin, 6 parts by weight of toluene, 3.5 parts by weight of methylethyl ketone, 6 parts by weight of mineral spirit and 4 parts by weight of acetone to make slurry, so that dielectric layer paste was obtained.

By kneading by a three-roll mill 100 parts by weight of Ni particles having an average particle diameter of 0.2 μm, 40 parts by weight of an organic vehicle (obtained by dissolving 8 parts by weight of ethyl cellulose in 92 parts by weight of butyl carbitol) and 10 parts by weight of butyl carbitol to make slurry, so that internal electrode paste was obtained.

By using the obtained dielectric layer paste, a sheet was formed on a PET film by the doctor blade method and dried, so that a green sheet was obtained. At this time, a thickness of the green sheet was made to be 2.5 μm. After printing the internal electrode paste thereon, the sheet was removed from the PET film. Then, thus obtained green sheets and protective green sheet (the internal electrode paste is not printed thereon) were stacked, pressed to bond, so that a green chip was obtained.

Next, the green chip was cut to a predetermined size, subjected to binder removal processing, firing and annealing under the conditions explained below, so that a multilayer ceramic sintered body was produced.

The binder removal processing was performed under the condition below.
Temperature raising rate: 30° C./hour
Holding temperature: 275° C.
Holding time: 8 hours
Atmosphere: in the air The firing was performed under the condition below.
Temperature raising rate: 200° C./hour
Holding temperature: 1180 to 1210° C.
Holding time: 2 hours
Oxygen partial pressure: $5 \times 10^{-12}$ Pa
Atmosphere: $H_2$—$N_2$—$H_2O$ The annealing was performed under the condition below.
Temperature raising rate: 200° C./hour
Holding temperature: 900 to 1100° C.
Holding time: 2 hours
Oxygen partial pressure: $1 \times 10^{-6}$ Pa
Atmosphere: wet $N_2$ gas Note that a wetter with a water temperature of 35° C. was used to wet the atmosphere gases in firing and re-oxidization processing.

On both sides of the thus obtained sintered body, In—Ga was applied as terminal electrodes, so that a capacitor sample was obtained.

A size of the obtained capacitor samples was 3.2 mm×1.6 mm×0.6 mm, the number of dielectric layers sandwiched by internal electrode layers was 100, a thickness (a thickness between layers) of one dielectric layer was 2.0 μm, and a thickness of one internal electrode layer was 1.5 μm.

Specific permittivity "∈$_r$" was measured on the obtained capacitor. The measurement method was as below.

The specific permittivity (∈$_r$) was obtained by measuring capacitance under a condition of the reference temperature of 25° C. by using a digital LCR meter (4274A made by YHP), a frequency of 1 kHz and an input signal level (measurement voltage) of 1 Vrms. A specific permittivity was calculated from the obtained capacitance, a size of electrodes of the capacitor sample and a distance between the electrodes. Specific permittivity of 2800 or higher is considered preferable and 3000 or higher is furthermore preferable. The results are shown in FIG. 2.

Figure 2:
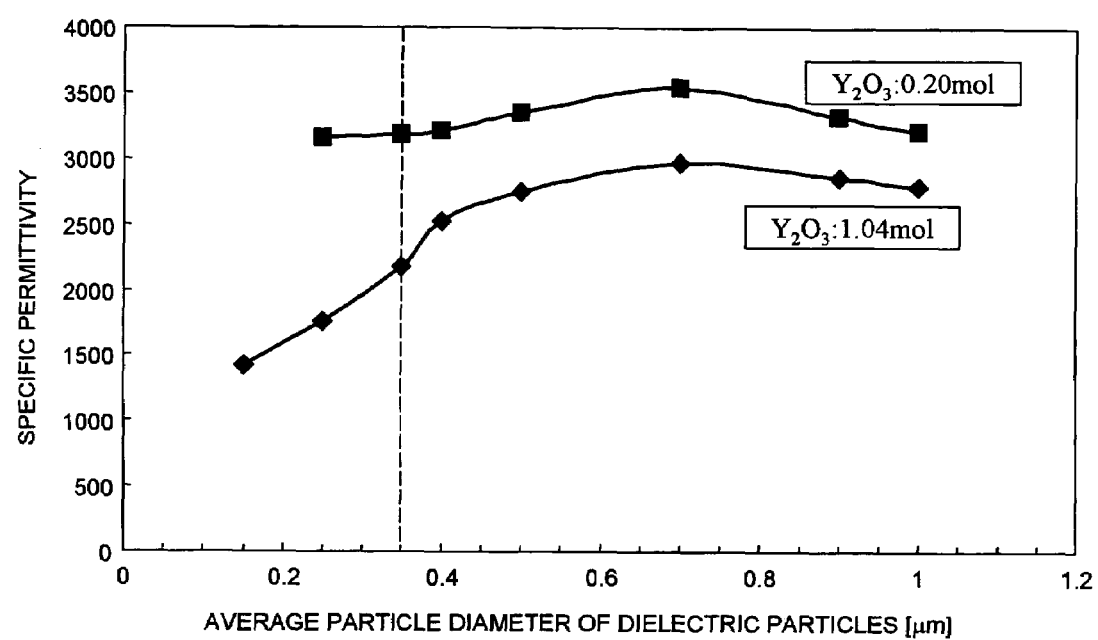
FIG. 2 is a graph showing relationships of specific permittivity and an average particle diameter of dielectric particles in an example of the present invention and a comparative example.
Figure 3:
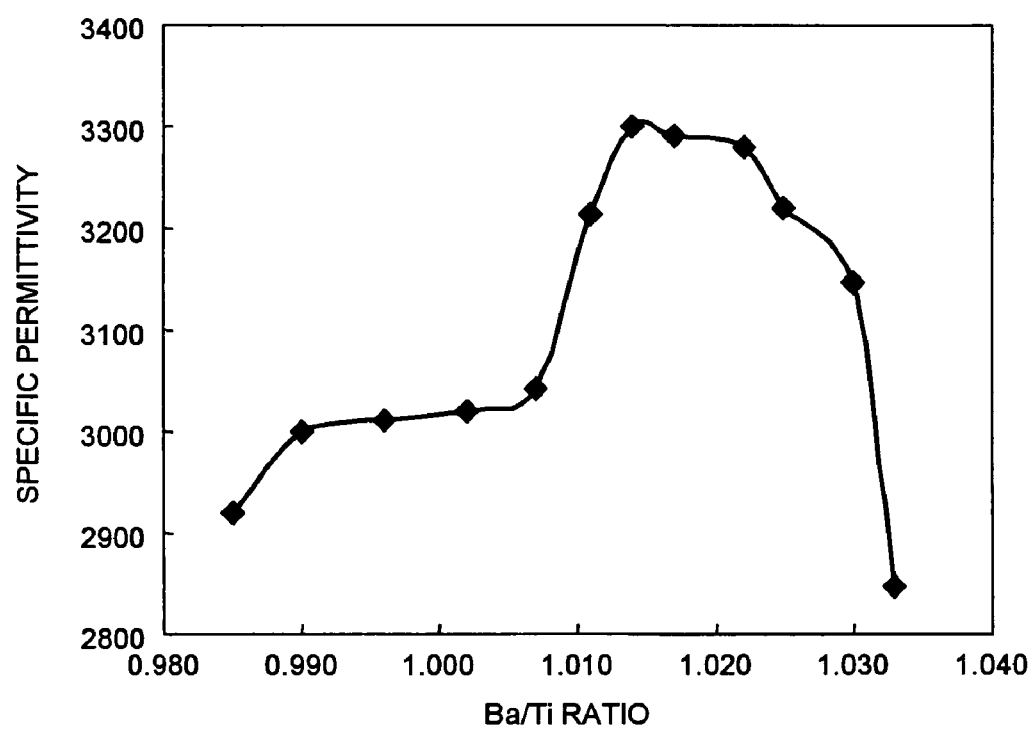
FIG. 3 is a graph showing a relationship of specific permittivity and Ba/Ti in an example of the present invention.

FIG. 2 shows values of specific permittivity of samples including 0.2 mole of $Y_2O_3$ and samples including 1.04 moles of $Y_2O_3$ when changing an average particle diameter of the dielectric particles from 0.15 μm to 1.0 μm. Note that among the samples including 0.2 mole of $Y_2O_3$, samples with dielectric particles having an average particle diameter of 0.35 μm or smaller are examples, and samples with an average particle diameter of larger than 0.35 μm are comparative examples.

As is clear from FIG. 2, in samples including 1.04 moles of $Y_2O_3$ (comparative examples), an abrupt decline of the specific permittivity is observed when an average particle diameter of the dielectric particles becomes smaller than 0.40 μm. However, in samples including 0.2 mole of $Y_2O_3$ (examples and comparative examples), a decline of the specific permittivity is not observed much even when an average particle diameter of the dielectric particles becomes small. From the facts, when an average particle diameter of the dielectric particles becomes smaller, particularly when 0.35 μm or smaller, high permittivity can be maintained by decreasing a content of $Y_2O_3$.

At temperatures −25° C. and +85° C., a direct current voltage having electric field strength of 1V/μm was applied to the capacitor samples, and capacitance in a state of being applied with the direct current voltage was measured. By using as an criterion capacitance at a temperature of 20° C. and applied voltage of 0V, a capacity-temperature change rate ($\Delta C/C_{20}$) at each temperature was calculated. Those within ±10% were considered preferable at all temperature.

By keeping the capacitor samples in a state of being applied with a direct current voltage of 30V/μm at 200° C., a high temperature load lifetime (HALT) was measured. The high temperature load lifetime is particularly significant when making the dielectric layers thinner. In the present example, time from the start of application of the direct current voltage until reaching of a current value of a detected current to 2 mA or higher in a state of being applied with the direct current voltage is defined as a lifetime. 25 hours or longer is considered preferable, 35 hours or longer is more preferable and 50 hours or longer is furthermore preferable. The results are shown in Table 1.

Table 1

TABLE 1

| Sample No. | Average Particle Diameter [μm] | Half Value Width [Degree] | Main Component BaTiO$_3$ [mol] | MgO [mol] | Y$_2$O$_3$ [mol] | V$_2$O$_5$ [mol] | Ba$_\alpha$Ca$_{(1-\alpha)}$SiO$_3$ α | [mol] | MnO [mol] | Cr$_2$O$_3$ [mol] | Firing Temperature [° C.] | Specific Permittivity (1 Vrm/μm) | Capacity-Temperature Change Rate (1 V/μm) $\Delta C./C._{20}$ [%] −25° C. | 85° C. | High Temperature Load Lifetime [hr] |
|---|---|---|---|---|---|---|---|---|---|---|---|---|---|---|---|
| 1 | 0.40 | 0.133 | 100 | 1.78 | 0.20 | 0.06 | 0.58 | 1.59 | 0.00 | 0.00 | 1210 | 2190 | −0.5 | −9.9 | 19 |
| 2 | 0.25 | 0.135 | 100 | 1.78 | 0.20 | 0.06 | 0.58 | 1.59 | 0.00 | 0.00 | 1180 | 3022 | −3.4 | −6.3 | 50 |

Example 2

Furthermore, samples having the same composition as that in the sample No. 7 listed as a comparative example in Table 2 in the paragraph number 0105 in the patent article 1 and dielectric particles having a changed average particle diameter were produced in the same way as in the example 1, and the characteristics were measured. Both of the compositions are in the range of the present invention. The average particle diameter of the dielectric particles are 0.40 μm in the sample described in the patent article 1 and 0.25 μm in the sample of the present example. Also, a half value width of a peak of (111) plane of the dielectric ceramic composition was measured. A measurement condition of X-ray diffraction was a voltage of 30 kV, a current of 30 mA, in a range of 2θ=10° to 80°, a scanning speed of 1/16 deg/min, and an integral time of 1 sec.

In evaluations of the characteristics, a capacity-temperature change rate ($\Delta C/C_{20}$) and a high temperature load lifetime (accelerated lifetime of insulation resistance/HALT) were measured in addition to specific permittivity. Measurement methods of a capacity-temperature change rate ($\Delta C/C_{20}$) and a high temperature load lifetime were as below.

As is clear from Table 1, the sample 1, wherein the composition and half value width are in the ranges of the present invention but an average particle diameter of the dielectric particles is out of the range of the present invention, exhibits poor characteristics.

Accordingly, it is known from FIG. 2 and Table 1 that, when an average particle diameter of the dielectric particles is 0.35 μm or smaller, not only the specific permittivity but also the high temperature load lifetime declines by an approach of the related art to improve a high temperature load lifetime by increasing an adding amount of $Y_2O_3$.

Example 3

Next, samples were produced in the same way as in the example 1 except for changing an average particle diameter of the dielectric particles to 0.25 μm and changing a composition of subcomponents of the dielectric ceramic composition to a composition shown in Table 2, and measurements were made in the same way as in the example 2. The results are shown in Table 2.

Table 2

TABLE 2

| Sample No. | Average Particle Diameter [μm] | Half Value Width [Degree] | Main Component BaTiO₃ [mol] | Subcomponent MgO [mol] | Y₂O₃ [mol] | V₂O₅ [mol] | Ba$_\alpha$Ca$_{(1-\alpha)}$SiO₃ α | [mol] | MnO [mol] | Cr₂O₃ [mol] | Firing Temperature [° C.] | Specific Permittivity (1 Vrm/μm) | Capacity-Temperature Change Rate (1 V/μm) ΔC./C.₂₀ [%] −25° C. | 85° C. | High Temperature Load Lifetime [hr] |
|---|---|---|---|---|---|---|---|---|---|---|---|---|---|---|---|
| 3 | 0.25 | 0.135 | 100 | 0.05 | 0.30 | 0.10 | 0.58 | 1.00 | 0.00 | 0.00 | 1180 | 3893 | −5.2 | −5.2 | 45 |
| 4 | 0.25 | 0.135 | 100 | 0.11 | 0.30 | 0.10 | 0.58 | 1.00 | 0.00 | 0.00 | 1185 | 3721 | −4.3 | −6.3 | 48 |
| 5 | 0.25 | 0.135 | 100 | 0.81 | 0.30 | 0.10 | 0.58 | 1.00 | 0.00 | 0.00 | 1200 | 3292 | −3.2 | −7.6 | 52 |
| 6 | 0.25 | 0.135 | 100 | 1.78 | 0.30 | 0.10 | 0.58 | 1.00 | 0.00 | 0.00 | 1210 | 3157 | −1.2 | −8.5 | 53 |
| 7 | 0.25 | 0.135 | 100 | 2.96 | 0.30 | 0.10 | 0.58 | 1.00 | 0.00 | 0.00 | 1210 | 3001 | 0.3 | −9.7 | 55 |
| 8 | 0.25 | 0.135 | 100 | 0.81 | 0.01 | 0.10 | 0.58 | 1.00 | 0.00 | 0.00 | 1170 | 3356 | −4.4 | −7.3 | 35 |
| 9 | 0.25 | 0.135 | 100 | 0.81 | 0.20 | 0.10 | 0.58 | 1.00 | 0.00 | 0.00 | 1180 | 3145 | −4.5 | −5.9 | 48 |
| 10 | 0.25 | 0.135 | 100 | 0.81 | 0.48 | 0.10 | 0.58 | 1.00 | 0.00 | 0.00 | 1210 | 3047 | −2.3 | −8.7 | 60 |
| 11 | 0.25 | 0.135 | 100 | 0.81 | 0.30 | 0.00 | 0.58 | 1.00 | 0.00 | 0.00 | 1220 | 3350 | −1.1 | −9.2 | 39 |
| 12 | 0.25 | 0.135 | 100 | 0.81 | 0.30 | 0.01 | 0.58 | 1.00 | 0.00 | 0.00 | 1200 | 3342 | −1.5 | −8.5 | 42 |
| 13 | 0.25 | 0.135 | 100 | 0.81 | 0.30 | 0.06 | 0.58 | 1.00 | 0.00 | 0.00 | 1200 | 3320 | −3.1 | −8.2 | 44 |
| 14 | 0.25 | 0.135 | 100 | 0.81 | 0.30 | 0.19 | 0.58 | 1.00 | 0.00 | 0.00 | 1190 | 3153 | −3.9 | −7.7 | 55 |
| 15 | 0.25 | 0.135 | 100 | 0.81 | 0.30 | 0.10 | 0.58 | 0.51 | 0.00 | 0.00 | 1240 | 3450 | 0.2 | −9.8 | 42 |
| 16 | 0.25 | 0.135 | 100 | 0.81 | 0.30 | 0.10 | 0.58 | 2.01 | 0.00 | 0.00 | 1190 | 3212 | −3.2 | −8.5 | 49 |
| 17 | 0.25 | 0.135 | 100 | 0.81 | 0.30 | 0.10 | 0.58 | 3.02 | 0.00 | 0.00 | 1170 | 3032 | −4.2 | −8.1 | 37 |
| 18 | 0.25 | 0.135 | 100 | 0.81 | 0.30 | 0.10 | 0.58 | 9.97 | 0.00 | 0.00 | 1150 | 3002 | −5.8 | −6.3 | 35 |

As is clear from Table 2, samples 3 to 18, wherein compositions of the subcomponents are in the range of the present invention, exhibited preferable results in all of a specific permittivity, capacity change rate and high temperature load lifetime.

Examples 4

Next, samples were produced in the same way as in the example 1 except for changing Ba/Ti indicating a mole ratio of Ba and Ti in BaTiO₃ as the main component of the dielectric ceramic composition and changing a composition of subcomponents to compositions shown in Table 3, and measurements were made in the same way as in the example 2. The results are shown in Table 3 and FIG. 3 to FIG. 6.

Table 3

It is known from Table 3 that all of the samples 19 to 30 satisfy the characteristics. Also, as is clear from Table 3 and FIG. 3, when Ba/Ti was in a range of 0.990 to 1.030, the half value width was 0.140 degree or smaller and the specific permittivity was 3000 or higher, which were preferable. Particularly, when Ba/Ti was in a range of 1.011 to 1.030, furthermore preferable results were obtained.

Figure 4:
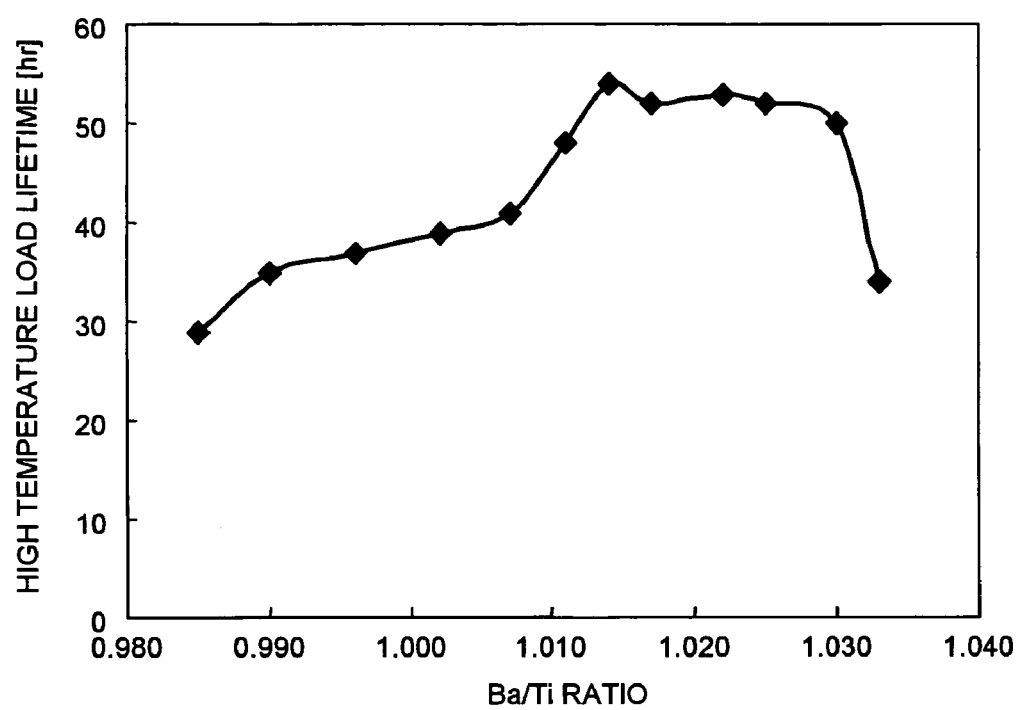
FIG. 4 is a graph showing a relationship of a high temperature load lifetime and Ba/Ti in an example of the present invention.

As is clear from Table 3 and FIG. 4, when Ba/Ti is in a range of 0.990 to 1.030, the high temperature load lifetime became 35 hours or longer, which was preferable. Particularly, when Ba/Ti was in a range of 1.011 to 1.030, furthermore preferable results were obtained.

Figure 5:
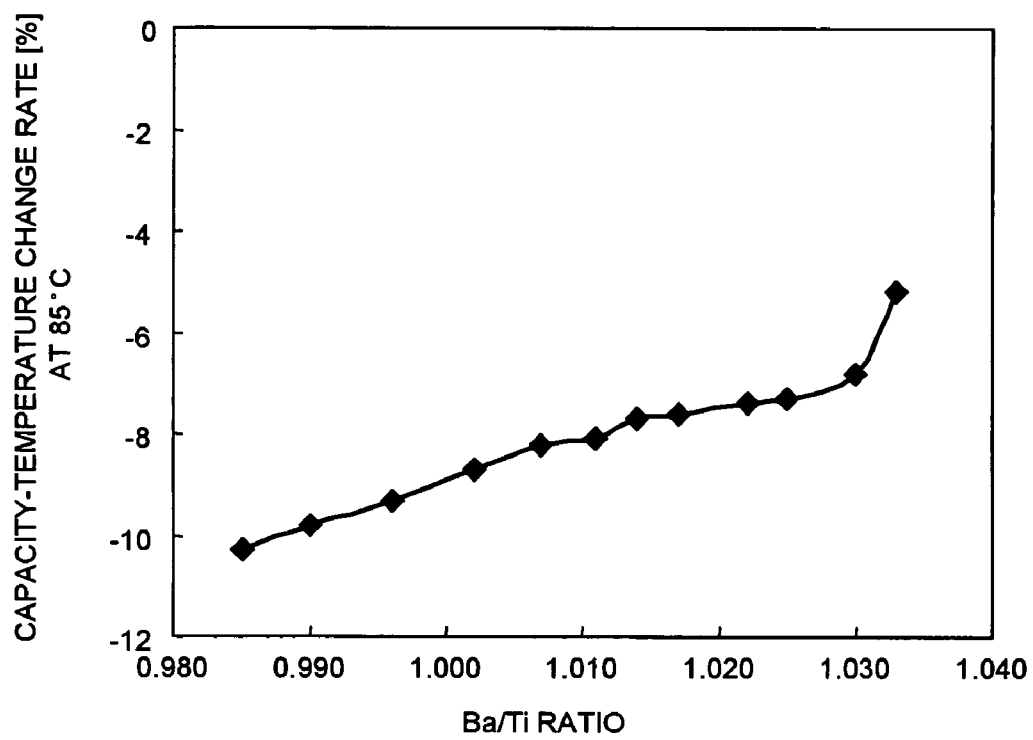
FIG. 5 is a graph showing a relationship of a capacity-temperature change rate at 85° C. and Ba/Ti in an example of the present invention.
Figure 6:
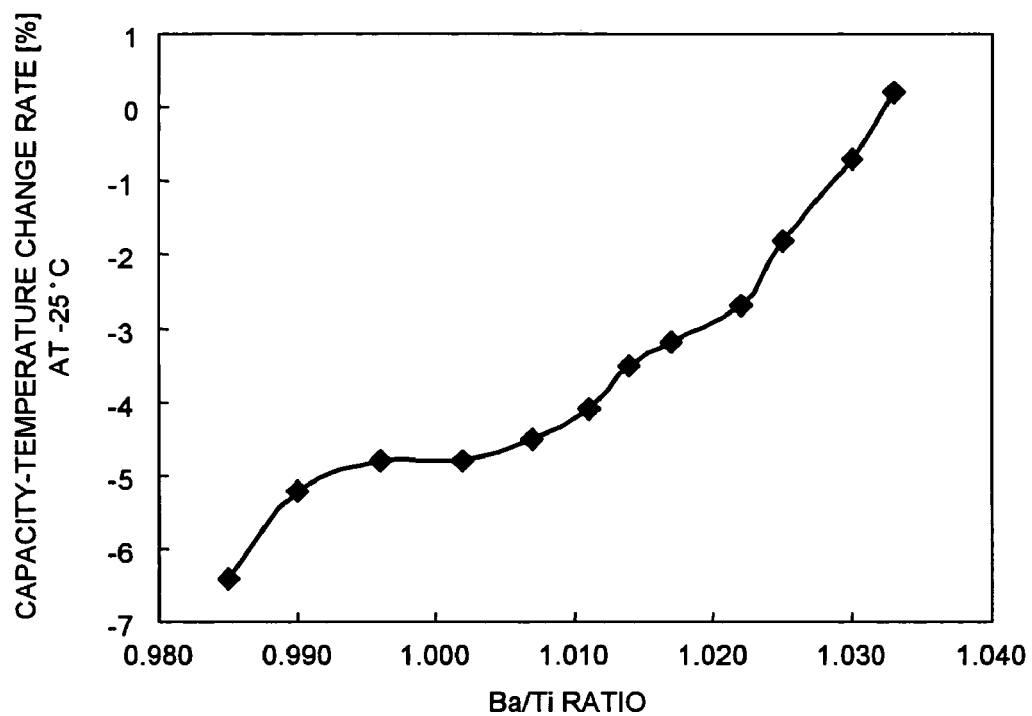
FIG. 6 is a graph showing a relationship of a capacity-temperature change rate at −25° C. and Ba/Ti in an example of the present invention.

As is clear from Table 3, FIG. 5 and FIG. 6, as Ba/Ti became larger, the capacity-temperature change rate became more preferable. While, when Ba/Ti is too large, character-

TABLE 3

| Sample No. | Average Particle Diameter [μm] | Ba/Ti Ratio | Half Value Width [Degree] | Main Component BaTiO₃ [mol] | Subcomponent MgO [mol] | Y₂O₃ [mol] | V₂O₅ [mol] | Ba$_\alpha$Ca$_{(1-\alpha)}$SiO₃ α | [mol] | MnO [mol] | Cr₂O₃ [mol] | Firing Temperature [° C.] | Specific Permittivity (1 Vrm/μm) | Capacity-Temperature Change Rate (1 V/μm) ΔC./C.₂₀ [%] −25° C. | 85° C. | High Temperature Load Lifetime [hr] |
|---|---|---|---|---|---|---|---|---|---|---|---|---|---|---|---|---|
| 19 | 0.25 | 0.985 | 0.143 | 100 | 0.81 | 0.30 | 0.10 | 0.58 | 1.00 | 0.00 | 0.00 | 1180 | 2920 | −6.4 | −10.0 | 29 |
| 20 | 0.25 | 0.990 | 0.140 | 100 | 0.81 | 0.30 | 0.10 | 0.58 | 1.00 | 0.00 | 0.00 | 1180 | 3000 | −5.2 | −9.8 | 35 |
| 21 | 0.25 | 0.996 | 0.139 | 100 | 0.81 | 0.30 | 0.10 | 0.58 | 1.00 | 0.00 | 0.00 | 1180 | 3012 | −4.8 | −9.3 | 37 |
| 22 | 0.25 | 1.002 | 0.139 | 100 | 0.81 | 0.30 | 0.10 | 0.58 | 1.00 | 0.00 | 0.00 | 1180 | 3021 | −4.8 | −8.7 | 39 |
| 23 | 0.25 | 1.007 | 0.138 | 100 | 0.81 | 0.30 | 0.10 | 0.58 | 1.00 | 0.00 | 0.00 | 1190 | 3043 | −4.5 | −8.2 | 41 |
| 24 | 0.25 | 1.011 | 0.136 | 100 | 0.81 | 0.30 | 0.10 | 0.58 | 1.00 | 0.00 | 0.00 | 1200 | 3213 | −4.1 | −8.1 | 48 |
| 25 | 0.25 | 1.014 | 0.135 | 100 | 0.81 | 0.30 | 0.10 | 0.58 | 1.00 | 0.00 | 0.00 | 1200 | 3301 | −3.5 | −7.7 | 54 |
| 26 | 0.25 | 1.017 | 0.135 | 100 | 0.81 | 0.30 | 0.10 | 0.58 | 1.00 | 0.00 | 0.00 | 1200 | 3292 | −3.2 | −7.6 | 52 |
| 27 | 0.25 | 1.022 | 0.134 | 100 | 0.81 | 0.30 | 0.10 | 0.58 | 1.00 | 0.00 | 0.00 | 1220 | 3281 | −2.7 | −7.4 | 53 |
| 28 | 0.25 | 1.025 | 0.135 | 100 | 0.81 | 0.30 | 0.10 | 0.58 | 1.00 | 0.00 | 0.00 | 1230 | 3221 | −1.8 | −7.3 | 52 |
| 29 | 0.25 | 1.030 | 0.137 | 100 | 0.81 | 0.30 | 0.10 | 0.58 | 1.00 | 0.00 | 0.00 | 1250 | 3147 | −0.7 | −6.8 | 50 |
| 30 | 0.25 | 1.033 | 0.142 | 100 | 0.81 | 0.30 | 0.10 | 0.58 | 1.00 | 0.00 | 0.00 | 1260 | 2847 | 0.2 | −5.2 | 34 | istics of the specific permittivity and high temperature load lifetime decline, so that it is preferable that Ba/Ti is in a range of 0.990 to 1.030 and the half value width is 0.140 degree or smaller in view of balancing the specific permittivity, capacity-temperature change rate and high temperature load lifetime.

As explained above, when an average particle diameter of the dielectric particles becomes smaller, particularly when 0.35 μm or smaller, the characteristics decline in the related art. An improvement of the high temperature load lifetime was attained by increasing an adding amount of $Y_2O_3$ in the related art, while in the present invention, by inversely decreasing the adding amount of $Y_2O_3$ and suitably adjusting a composition of other subcomponents, all of the characteristics of the specific permittivity, capacity-temperature change rate and high temperature load lifetime were satisfied. Also, it was confirmed that preferable characteristics were exhibited by setting Ba/Ti in $BaTiO_3$ and a half value width of a peak of (111) plane of the dielectric ceramic composition to be in certain value ranges.

What is claimed is:

1. A dielectric ceramic composition comprising:
   a main component including barium titanate;
   a first subcomponent including a magnesium oxide;
   a second subcomponent including a yttrium oxide;
   a third subcomponent including a vanadium oxide; and
   a glass component including a silicon oxide as the main component;
   wherein rates of respective subcomponents with respect to 100 moles of barium titanate as the main component are;
   the first subcomponent: 0.1 to 3 moles, the second subcomponent: 0.01 or more to less than 0.5 mole,
   the third subcomponent: 0.01 to 0.2 mole, and
   the glass component: 0.5 to 10 moles;
   a manganese oxide and a chrome oxide are substantially not included;
   an average particle diameter of dielectric particles composing said dielectric ceramic composition is 0.35 μm or smaller;
   wherein Ba/Ti, indicating a mole ratio of Ba and Ti in the barium titanate, is in a range of 1.011 to 1.030; and
   wherein the glass component is expressed by a chemical formula $M_xSiO_3$, wherein "M" includes at least one of Ba, Ca, Sr, Li and B and "x" is in a range of ⅔ to 2.

2. The dielectric ceramic composition as set forth in claim 1, wherein a half value width of a peak of (111) plane of said dielectric ceramic composition is 0,143 degree or smaller.

3. The dielectric ceramic composition as set forth in claim 1, wherein a content of a manganese oxide in said dielectric ceramic composition is 0,01 mole or smaller with respect to 100 moles of barium titanate as said main component.

4. The dielectric ceramic composition as set forth in claim 1, wherein a content of a chrome oxide in said dielectric ceramic composition is 0,01 mole or smaller with respect to 100 moles of barium titanate as said main component.

5. An electronic device comprising a dielectric layer composed of the dielectric ceramic composition as set forth in claim 1.

6. A multilayer ceramic capacitor comprising a capacitor element body obtained by alternately stacking dielectric layers composed of the dielectric ceramic composition as set forth in claim 1 and internal electrode layers.

7. The multilayer ceramic capacitor as set forth in claim 6, wherein a capacity-temperature change rate ($\Delta C/C_{20}$) in a state of being applied with a direct current voltage having electric field strength of 1 V/μm at a temperature of 85° C. is within ±10% when assuming capacitance with an applied voltage of 0V at a temperature of 20° C. as the criterion.

8. The multilayer ceramic capacitor as set forth in claim 6, wherein a thickness of said dielectric layer is 3 μm or thinner.

9. The multilayer ceramic capacitor as set forth in claim 6, wherein, when measuring a high temperature load lifetime by maintaining a state of applying a direct current of 30 V/μm at a testing temperature of 200° C., time from the start of the application of said direct current voltage until reaching of a current value of a detected current to 2 mA or higher in a state of being applied with said direct current voltage is 25 hours or longer.

* * * * *